United States Patent Office 2,886,587
Patented May 12, 1959

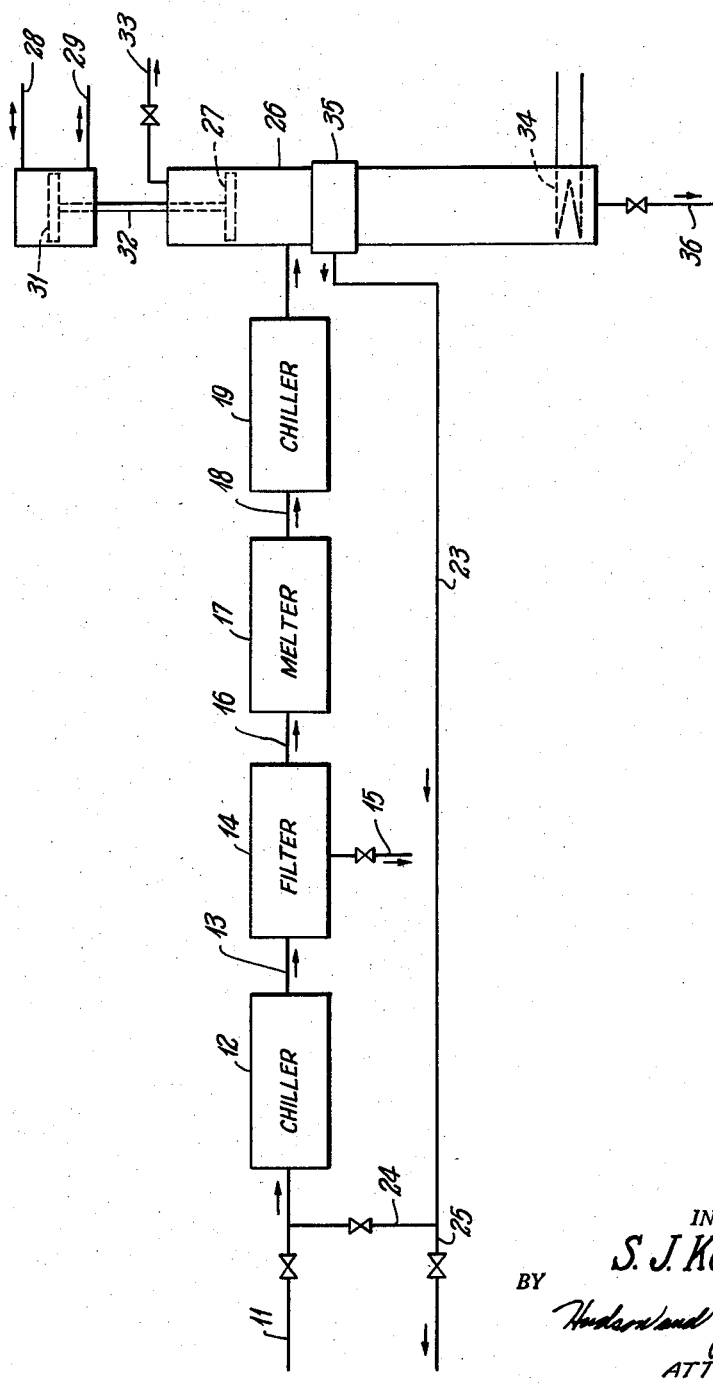

2,886,587

SEPARATION BY CRYSTALLIZATION

Samuel J. Kolner, Borger, Tex., assignor to Phillips Petroleum Company, a corporation of Delaware Application July 6, 1954, Serial No. 441,448

10 Claims. (Cl. 260—475)

This invention relates to separation by crystallization. In one of its more specific aspects, the invention relates to improved apparatus for the separation of components of mixtures by fractional crystallization. In another of its more specific aspects, the invention relates to an improved method for separating the components of liquid mixtures by fractional crystallization.

Separations of compounds may be effected by distillation, solvent extraction and crystallization. Although distillation and extraction are generally preferred because of economy and convenience of operation, there are some instance in which such processes cannot be successfully utilized. Many chemical isomers have similar boiling points and solubilities and cannot be separated satisfactorily by distillation or extraction. Separation by means of fractional crystallization can be satisfactorily utilized in many cases in making such separations. Fractional crystallization has one great advantage over other methods of separation in that it is the only separation method which theoretically offers a pure product in a single stage of operation in systems in which the desired component of a mixture solidifies at temperatures above which the other components solidify. Thus, whereas distillation and extraction theoretically require infinite stages for a pure product, crystallization in many cases requires only one. This is because of phase equilibrium in distillation and extraction, while by crystallization, substantially pure crystals can be separated from many solutions in one stage, regardless of the liquid composition. Thus, whereas separation by distillation and extraction becomes more difficult as the purity of the product increases, separation by crystallization becomes easier.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required. This invention results in a very close approach to the ideal crystallization stage.

Methods of separating a pure component from a mixture have been devised, whereby the liquid mixture to be separated is introduced into a heat exchange zone wherein a slurry of crystals is formed and that slurry of crystals is then introduced into a purification zone through which the crystals are moved as a compact mass. One such means for purifying crystals has been disclosed by J. Schmidt, Re. 23,810.

In the process disclosed by J. Schmidt, a mass of crystals is moved through an elongated purification chamber to a melting zone wherein the crystals are melted and a portion of the melt is displaced countercurrently through at least a portion of the crystal mass so as to displace occluded impurities from the crystal mass approaching the melting zone. The exact mechanism whereby this displaced melt improves the purity of the final product is not completely understood. However, it is presently believed that the substantially pure material which is refluxed through at least a portion of the crystal mass displaces occluded impurities from the crystal mass approaching the melting zone and replaces the impurities in the interstices of the crystal mass. A high yield of product is obtained since the high melting product refreezes from the reflux stream as it comes in contact with the cold crystal mass moving toward the melting zone. Thus, the portion of the crystal mass which approaches the melting zone does not contain any appreciable amount of occluded impurities and the resulting product which is removed from the melting zone is of extremely high purity. When the crystals are introduced into the purification chamber at too low a temperature, the pure melt material freezes completely when forced into the crystal mass, with the result that the crystal mass becomes impervious. By my process, I not only eliminate included impurities from the crystals but also introduce the crystals into the purification chamber at a temperature which is high enough that the amount of melt required to heat the crystals will not be so large that, on refreezing, will cause plugging of the column.

In order to make some separations of the constituents of a mixture by fractional crystallization, it is necessary to adjust the temperature of the mixture to one which is far below the solidification point of any one of the pure constituents. For example, when para-xylene is separated from a mixture of isomeric alkyl benzenes, it is necessary to cool the mixture to a temperature in the neighborhood of about −57° to about −73° C., depending upon the concentration of the constituents in the mixture, in order to crystallize the para-xylene. When the crystals of para-xylene are formed in this manner, small quantities of other constituents are trapped within the para-xylene crystals. Such trapped impurities, which are generally in the liquid state, cannot be removed by the conventional methods of displacing occluded impurities from the crystals. By my improved method of operation, these included impurities are removed from the crystals, with the result that the final product is a more pure product which is obtained at higher yields than is obtained by other methods. By the method of my invention, a product which has better than 98 percent purity, and in some cases even as high as 99.9 percent purity, is obtained with very high continuous yields.

The following are objects of the invention.

An object of the invention is to provide an improved system for the separation of a pure component from liquid mixtures. Another object of the invention is to provide an improved process for the separation of a pure component from a liquid mixture. Another object of the invention is to provide a method for rapidly separating a component having a relatively high solidification point from a mixture which has a relatively low eutectic solidification point. Another object of the invention is to provide a process which will permit the removal of included impurities from crystals of otherwise high purity. Other and further objects of the invention will be apparent to those skilled in the art upon study of the accompanying disclosure.

Broadly speaking, this invention resides in forming crystals which have little or no included impurities and subjecting those crystals to purification so as to remove occluded impurities therefrom. By my process, mother liquor is removed from crystals after their initial formation at a low temperature necessary to form crystals in the liquid mixture. After the mother liquor has been removed therefrom, the crystals are heated so as to melt a major portion thereof. A sufficient amount of the crystals is melted to release into the melt impurities which are included within the crystal structure. After this melting step, the temperature of the crystals and melt is lowered so as to recrystallize the desired component. The amount of impurity present during the second crystallization step is quite small and the amount of impurity which is trapped in the crystal structures as they are formed is infinitesimal. This recrystallization takes place at a temperature which is much higher than the temperature to which it was necessary to lower the original liquid mixture in order to crystallize the desired component from that mixture. Thus, the crystal mass which is removed from the second crystallization step is at a temperature much higher than the crystals removed from the first crystallization step. The slurry of crystals obtained in the second crystallization step is then subjected to purification so as to remove occluded impurities from the crystals.

I have generally found that the included impurities are released into the melt upon heating the crystal mass so as to obtain a slurry having a solids content of about 12 percent or less. If desired, the crystals can be totally melted and recrystallized, which procedure results in an ultimate of purity of the final product. If some sacrifice can be sustained in the purity of the product, a higher solids content in the melt transmitted to the second crystallization step can be utilized.

Although, as I have pointed out hereinbefore, this invention is particularly applicable to systems in which the solidification point of the desired pure component is considerably higher than the temperature to which the component is cooled in the liquid mixture to form crystals thereof, this procedure can be advantageously utilized in practically any system to which fractional crystallization is applicable so as to increase the efficiency of the process. This invention is applicable to separations in many multi-component systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say 15 to 25 percent purity, so as to effect a purity upwards of 98 percent. In order to illustrate some of the systems to which the invention is applicable, the following compounds are grouped with respect to their boiling points.

| Group A | B.P., ° C. | F.P., ° C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., ° C. | F.P., ° C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., ° C. | F.P., ° C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., ° C. | F.P., ° C. |
|---|---|---|
| Aniline | 184.4 | −6.2 |
| Toluene | 110.8 | −95 |
| Benzene | 80.0 | 5.5 |

| Group E | B.P., ° C. | F.P., ° C. |
|---|---|---|
| Carbon tetrachloride | 77 | −22.8 |
| Chloroform | 61 | −63.5 |
| CS₂ | 46.3 | −103.6 |
| Acetone | 56.5 | −95 |

| Group F | B.P., ° C. | F.P., ° C. |
|---|---|---|
| Ortho-xylene | 144 | −27.1 |
| Meta-xylene | 138.8 | −47.4 |
| Para-xylene | 138.5 | 13.2 |

| Group G | B.P., ° C. | F.P., ° C. |
|---|---|---|
| Ortho-cymene | 175.0 | −73.5 |
| Meta-cymene | 175.7 | <−25 |
| Para-cymene | 176.0 | −73.5 |

| Group H | B.P., ° C. | M.P., ° C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., ° C. | M.P., ° C. |
|---|---|---|
| Ortho-nitrotoluene | 222.3 | α−10.6, β−4.1 |
| Meta-nitrotoluene | 231 | 15.5 |
| Para-nitrotoluene | 238 | 51.3 |

Systems consisting of any combination of two or more of the components within any one of the groups may be separated by the process of the invention, as well as systems made up of components selected from different groups; for example, benzene may be separated from a benzene, n-hexane or n-heptane system in which the benzene is present in an amount greater than the eutectic concentration. In the same manner, para-xylene may be readily separated from a mixture of para- and meta-xylenes or from para-, meta-, and and ortho-xylenes. Benzene may also be separated from a mixture with toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone (1,4-benzenediol), para-cresol, para-dichlorobenzene, and such materials as high melting waxes, fatty acids, and high molecular normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained on study of the accompanying drawing, which is a schematic representation of the fractional crystallization system of this invention.

Referring to the drawing, a mixture of materials from which at least one constituent is to be separated is fed through conduit 11 to a heat exchanger, such as chiller 12, where the temperature of the mixture is adjusted so as to obtain crystals of at least a portion of at least one of the constituents of the mixture. Chiller 12 can be any conventional type chiller, preferably being of the scraped surface type, which is supplied with refrigeration means that are adequate to lower the temperature of the liquid mixture to that necessary to crystallize at least a major portion of at least one of the constituents thereof. As will be apparent from the discussion hereinabove, the temperature to which the mixture is adjusted in the heat exchanger will depend entirely upon the specific mixture, since the various materials have different solidification points and the solidification point of any given constituent of a mixture is dependent upon the constitution of the mixture. When a mixture of isomeric $C_8$ alkyl benzenes is fed through conduit 11 to chiller 12, that mixture is lowered to a temperature in the neighborhood of −57° to −73° C. When the desired product is relatively dilute in the feed stream, the temperature at which crystals will form will be relatively low.

The slurry resulting from chilling of the liquid mixture is passed through conduit 13 to filter 14 wherein uncrystallized material is separated from the crystals. The amount of uncrystallized material (mother liquor) which is left on the crystals is dependent upon the specific type of filter which is utilized. Any one of several different types of filters can be used for this step in my process. A rotary type filter, such as an Oliver filter or one of the higher speed types, such as a centrifuge, can be utilized, or a pressure type filter in which the crystals are compacted by some compacting means, such as a piston, can be used. Crystals are passed from filter 14 through conduit 16 to melter 17. Any type of melter can be used in this particular step, which will result in rapid and substantially uniform heating of the crystal mass. The melter can be supplied with internal heat exchange tubes, not shown, and/or can be supplied with an external heating jacket. If desired, a gaseous material which is inert to the materials introduced into melter 17 through conduit 16 can be heated and passed through the crystal mass in melter 17 to obtain the desired uniform heat exchange.

The material which has been heated in melter 17 is passed through conduit 18 to chiller 19. That material is then lowered to a temperature at which the desired component is once again crystallized, this time in a more concentrated form. Once again, using para-xylene as the desired constituent being separated from a mixture of isomeric alkyl benzenes, chiller 19 is operated so as to chill the material therein to a temperature in the range of about −32° to about 10° C., preferably −18° to 7° C. It is preferred that the material chilled in chiller 19 be cooled sufficiently to result in a solids content within the range of from 35 to 45 percent by weight. The chilled material is then introduced into an upstream portion of an elongated closed purification chamber 26. The crystals are moved by means of piston 27, which is motivated by the flow of fluids through conduits 28 and 29, which flow results in the movement of a drive piston 31 which is connected to piston 27 by means of shaft 32. Piston 27 may be either imperforate, so as to result in all materials downstream thereof remaining downstream, or may be perforate so as to move the crystals in a downstream direction while permitting liquids to flow through the piston, which liquid is then removed from chamber 26 through conduit 33. As the compacted crystal mass is moved in a downstream direction, the downstream end of that crystal mass is heated by means of a heat exchange element 34, which in the instant drawing is shown as heat exchange coils through which a hot heat exchange fluid can be passed. The specific means of heating the crystals in the downstream end of chamber 26 does not form a portion of this invention. Heat can be supplied to the crystals by means of electrical heating elements fitted externally or internally to the downstream portion of chamber 26.

As the downstream portion of the crystal mass is melted, a portion of the melt is displaced upstream through at least a portion of the crystal mass so as to displace occluded impurities from the interstices of that mass. It appears that at least a portion of the melt which is displaced into the crystal mass is refrozen on the crystals and is once again moved into heat exchange with heating element 34. Liquid which is displaced from the interstices of the crystal mass is removed through filter 35 and conduit 23. The concentration of the desired product in the stream removed through conduit 23 will determine the use which is to be made of the stream. The purified product is removed from chamber 26 through conduit 36.

It is desirable to so control the removal of pure product through conduit 36 or the concentration of crystals in the material passed from chiller 19 into the upstream portion of chamber 26 so as to obtain a stream removed through conduit 23 which has a concentration of desired component higher than that of the feed introduced through conduit 11. Such a stream is then returned to chiller 12 through conduit 24 for recrystallization of the desired component. By operating in this manner, larger crystals are obtained than can be obtained when crystallizing the desired component from a mixture in which the concentration of desired component is relatively low. When operation is such that the stream removed through conduit 23 has a low concentration of desired product, it is removed through conduit 25 for another desired use. If desired, that stream can be subjected to isomerization to form additional para-xylene, if the stream being handled is a mixture of isomeric $C_8$ alkyl benzenes.

In order to better illustrate my invention, I have provided the following example which exemplifies the invention but should not be construed to unduly limit the invention.

*Example*

A feed stream comprising a mixture of isomeric alkyl benzenes containing approximately 16 percent by weight para-xylene, together with ortho- and meta-xylene, ethyl benzene, and other aromatic hydrocarbons, is fed into a scraped surface chiller 12 through conduit 11 at a rate of 857 gallons per hour. The scraped surface chiller is operated at an outlet temperature of about −73° C. The resulting slurry is passed through conduit 13 to filter 14 where mother liquor is removed therefrom through conduit 15. The crystals are then conveyed through conduit 16 to melter 17 where they are heated to a temperature of about −12° C., so as to form a slurry having a solids content of about 12 percent by weight. The resulting slurry is introduced at a rate of 216 gallons per hour through conduit 18 to scraped surface chiller 19 which is operated at an outlet temperature of about −20° C. The crystal mass, having a solids content of about 40 percent, is passed from chiller 19 to chamber 26 wherein the crystals are compacted and moved to the heating zone in the downstream portion thereof wherein the crystals are melted and the melt is raised to a temperature of about 30° C. Para-xylene having a purity of about 99 percent is removed through conduit 36 at a rate of 88 gallons per hour. A liquid stream is removed through conduit 23, having a 40 percent concentration of para-xylene, and is removed at a rate of 128 gallons per hour. This stream is returned to chiller 12.

It will be apparent to those skilled in the art that various modifications of this invention can be made upon study of the accompanying disclosure. Such modifications are believed to be clearly within the spirit and the scope of this invention.

I claim:

1. A process for the purification of crystals formed at a first temperature which comprises melting a major portion of said crystals to release included impurities therefrom; chilling the material resulting from the melting step so as to recrystallize at least a portion of one component thereof at a temperature substantially higher than the first temperature; moving crystals so formed through an elongated purification zone as a compact mass; melting a portion of said crystals in a downstream portion of said purification zone; displacing a portion of the melt countercurrently through at least a portion of the length of said crystal mass so as to displace occluded impurities therefrom; removing liquid displaced from said crystal mass; and recovering a purified product from a downstream portion of said purification zone.

2. A process for the separation and purification of at least one of the components of a mixture which comprises adjusting the temperature of said mixture to one at which at least one but not all of said components is in crystalline form; separating resulting crystalline and non-crystalline materials; heating said crystals to melt a major portion thereof; recrystallizing the heated material at a temperature substantially higher than the first crystallization temperature so as to form a slurry having a solids content of at least 35 percent by weight; introducing said slurry into an upstream portion (with respect to crystal movement) of an elongated purification zone; moving said crystals toward a downstream portion of said zone as a compact mass; melting at least a portion of the compacted crystal mass in the downstream end portion (with respect to crystal movement) of said purification zone; displacing a portion of resulting melt countercurrently through at least a portion of the length of said crystal mass so as to displace occluded impurities therefrom; removing displaced liquid from an upstream end portion (with respect to crystal movement) of said purification zone; and removing a purified product from the downstream end portion of said purification zone.

3. The process of claim 2 wherein said mixture comprises para- and meta-xylenes, and at least one of said xylenes is recovered as a product.

4. The process of claim 2 wherein said mixture comprises para- and meta-cymenes, and at least one of said cymenes is recovered as a product.

5. The process of claim 2 wherein said mixture comprises dimethyl isophthalate and dimethyl terephthalate, and at least one of the dimethyl phthalates is recovered as a product.

6. The process of claim 2 wherein said mixture comprises para- and meta-nitro toluenes, and at least one of the nitro toluenes is recovered as a product.

7. The process of claim 2 wherein said mixture comprises cyclohexane and 2,2-dimethylpentane, and at least one of these hydrocarbons is recovered as a product.

8. The process for the separation and purification of at least one of the components of a mixture which comprises adjusting the temperature of said mixture to one at which at least one but not all of said components is in crystalline form; separating resulting crystalline and non-crystalline materials; heating said crystals to a temperature at which the resulting melt contains not more than 12 percent by weight of solids; recrystallizing the heated material so as to form a slurry having a solids content in the range of from 35 to 45 percent by weight; introducing said slurry into an upstream portion (with respect to crystal movement) of an elongated purification zone; moving said crystals toward a downstream portion of said zone as a compact mass; melting at least a portion of the compacted crystal mass in the downstream end portion (with respect to crystal movement) of said purification zone; displacing a portion of resulting melt countercurrently through at least a portion of the length of said crystal mass so as to displace occluded impurities therefrom; removing displaced liquid from an upstream end portion (with respect to crystal movement) of said purification zone; and removing a purified product from the downstream end portion of said purification zone.

9. The process for the separation and purification of at least one of the components of a mixture which comprises adjusting the temperature of said mixture to one at which at least one but not all of said components is in crystalline form; separating resulting crystalline and non-crystalline materials; heating said crystals to a temperature at which the resulting melt contains not more than 12 percent by weight of solids; recrystallizing the heated material so as to form a slurry having a solids content in the range of from 35 to 45 percent by weight; introducing said slurry into an upstream portion (with respect to crystal movement) of an elongated purification zone; moving said crystals toward a downstream portion of said zone as a compact mass; melting at least a portion of said compacted crystal mass in the downstream end portion (with respect to crystal movement) of said purification zone; displacing a portion of resulting melt countercurrently through at least a portion of the length of said crystal mass so as to displace occluded impurities therefrom; removing displaced liquid having a concentration of the desired component greater than that in said mixture from an upstream end portion (with respect to crystal movement) of said purification zone; crystallizing at least one but not all of said components of said displaced liquid together with the liquid mixture crystallized in the first crystallization step; and removing a purified product from the downstream end portion of said purification zone.

10. In a process for concentrating a compound which exists in admixture with other materials and is separable therefrom by crystallization, said process comprising cooling said admixture to a temperature at which said compound crystallizes therefrom, recovering crystals of said compound, introducing crystals of said compound into a purification zone which comprises a liquid removal zone, a reflux zone and a melting zone, moving crystals of said compound through said liquid removal zone, then through said reflux zone and then into said melting zone, melting crystals of said compound in said melting zone, removing part of the resultant melt as product, and forcing another part of said melt in a direction countercurrent to the flow of crystals through said reflux zone, the improvement which comprises melting a major portion of said crystals after initial formation thereof, recrystallizing a portion of the melted compound and thus forming crystals at a temperature substantially higher than said first mentioned temperature of crystal formation, and introducing crystals thus reformed into said purification zone and treating as previously described herein.

References Cited in the file of this patent

UNITED STATES PATENTS

| | | |
|---|---|---|
| 2,540,977 | Arnold | Feb. 6, 1951 |
| 2,651,665 | Booker | Sept. 8, 1953 |
| 2,683,178 | Findlay | July 6, 1954 |
| 2,747,001 | Weedman | May 22, 1956 |